United States Patent [19]
Giddens et al.

[11] 4,440,436
[45] Apr. 3, 1984

[54] CONVERTIBLE TOP FOR MOTORCYCLES AND SNOWMOBILES

[76] Inventors: Marian S. Giddens, 311 W. Hermosa Dr., Fullerton, Calif. 92645; Michael B. Arnold, P.O. Box 52428, Nairobi, Kenya

[21] Appl. No.: 375,753

[22] Filed: May 6, 1982

[51] Int. Cl.³ .............................................. B60J 7/00
[52] U.S. Cl. .................................... 296/107; 135/108; 280/289 G; 296/78.1
[58] Field of Search ...................... 296/102, 107, 78.1, 296/109; 280/289 S, 289 G; 135/108

[56] References Cited

U.S. PATENT DOCUMENTS

| | | | |
|---|---|---|---|
| 1,748,736 | 2/1930 | Selje | 296/107 |
| 2,612,900 | 10/1952 | Treppa | 135/108 |
| 3,284,130 | 11/1966 | Michael | 296/78.1 |
| 3,301,589 | 1/1967 | Hayden | 296/78.1 |
| 4,289,347 | 9/1981 | Holzwarth | 296/107 |

Primary Examiner—Bruce H. Stoner, Jr.
Assistant Examiner—John A. Carroll
Attorney, Agent, or Firm—Jackson, Jones & Price

[57] ABSTRACT

A canopy for motorcycles, snowmobiles and the bike which is convertible and mountable on a variety of such vehicles.

7 Claims, 6 Drawing Figures

CONVERTIBLE TOP FOR MOTORCYCLES AND SNOWMOBILES

BACKGROUND OF THE INVENTION

1. Field of the Invention

This invention relates to a convertible top for motorcycles and snowmobiles. The invention provides a bolt-on accessory for machines already equipped with a bolt-on windshield assembly and is designed for use in inclement weather conditions.

The prior art has provided a number of different rigid canopies which may be attached to motorcycles and removed therefrom. Such canopies are very inconvenient in that they remain in a permanent covering position once attached to the motorcycle and must be removed entirely from the vehicle and stored when not in use. Thus, in the case of brief periods of inclement weather, the rider is likely to find himself without any protection. On the other hand, should the weather clear, the rider is likely to find himself on the road and unable to remove and store the canopy.

SUMMARY OF THE INVENTION

Hence, it is an object of this invention to produce a bolt-on convertible canopy that will provide the riders of motorcycles and/or snowmobiles the comfort of dry conditions in inclement weather and which may be erected quickly when required and stowed away on the vehicle when not in use.

It is a further object of the invention to provide such a canopy with sufficient streamlining so as to enhance performance and comfort while maintaining the handling performance of the machine either at speed or in strong winds.

It is yet another object of this invention to produce a structure from readily available materials that are strong and light in weight.

It is a further object of this invention to provide a canopy structure which is easily mountable with a minimal amount of adjustment for all types of motorcycles and snowmobiles.

These and other objects are accomplished by provision of a pannier for mounting and storing a canopy carried by a plurality of frame members. The frame members are slidably and pivotably attached to one another so that they may fold collapsably into the pannier. When folded out of the pannier and fixed by convenient snap-on or similar hinges, the frame members provide support for a canopy over the vehicle. The pannier itself fits about the individual seat and the entire apparatus is designed to be simply attached and used.

BRIEF DESCRIPTION OF THE DRAWINGS

The preferred embodiment and best mode presently contemplated for practicing the subject invention will now be described in conjunction with the drawings of which.

DETAILED DESCRIPTION OF THE PREFERRED EMBODIMENT

Figure 1:
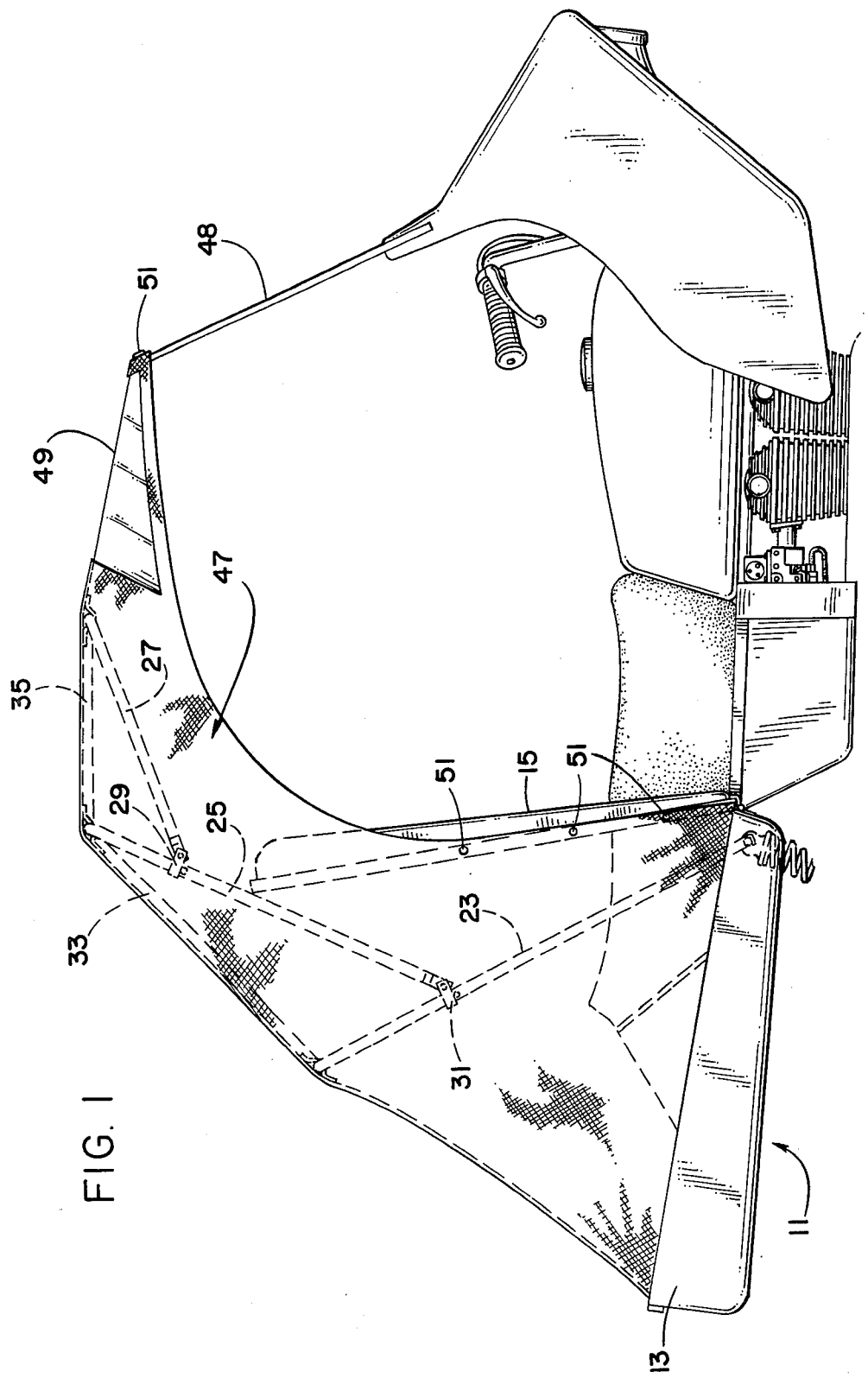
FIG. 1 is a side elevation of the preferred embodiment shown attached to a modern motorcycle.
Figure 2:
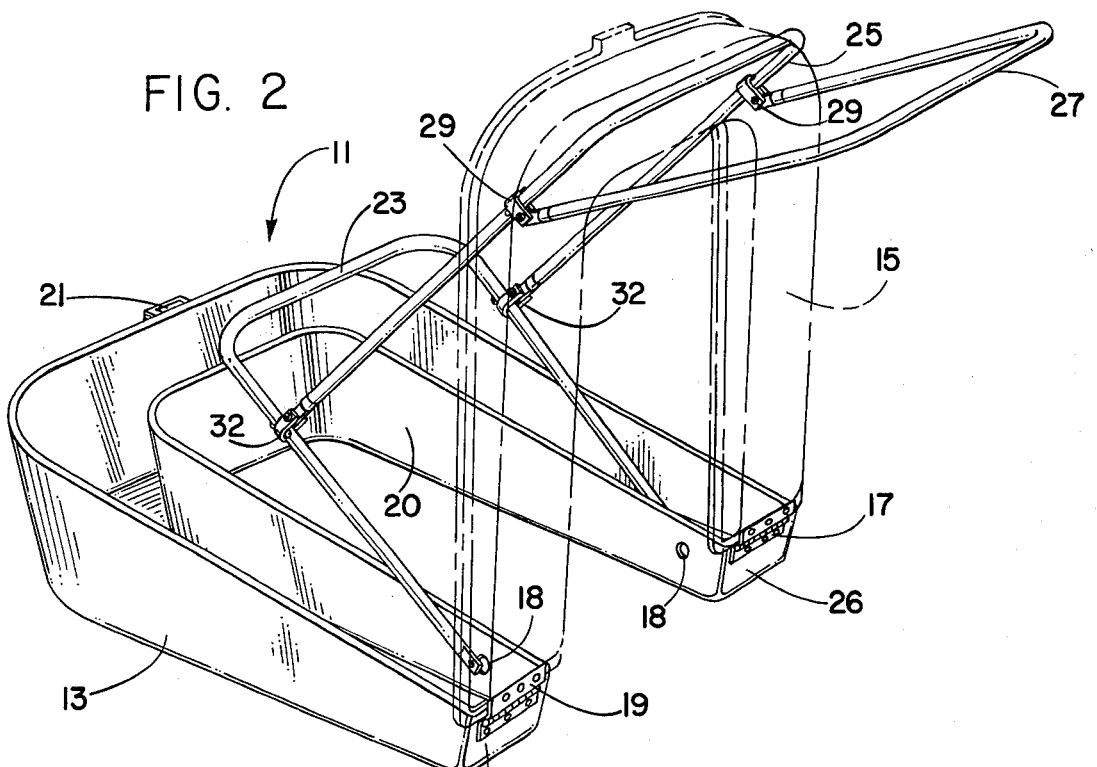
FIG. 2 is an isometric view of the framework of the preferred embodiment.

Now referring to FIGS. 1 and 2, a bolt-on pannier 11 is provided to attach and store a foldable canopy 47. The pannier 11 is constructed of fiberglass, injection molded plastic, or vacuum molded plastic to produce a rigid container of substantially U-shaped cross-section for holding the framework and flexible canopy 47. The pannier 11 consists of two parts, a base 13, and a lid 15. The lower base section 13 contains the canopy 47 and erectable frame. The base section 13 is bolted to the machine (FIG. 3) by bolts inserted through two apertures 18 (FIG. 2), one aperture 18 is being provided in the inner wall 20 of the substantially U-shaped channel near its respective terminal ends 24, 26.

The pannier 11 is of aerodynamic shape with all edges well-rounded. The lid 15 fits tightly over the lower section 13 to produce a waterproof container, and is fixed at the forward edge with two robust chromium plated hinges 17, 19 in such a manner as to prevent damage to the fiberglass or plastic. At the rear is a chromium plated locking device 21. When mounted on the machine, the pannier 11 is inclined upwards from front to rear at a shallow angle to the horizontal plane.

The erectable frame consists of three sections 23, 25, 27 of aluminum tubing, prebent to a substantially U-shape with large radius bends, and cut to the required lengths as shown in FIGS. 1 and 2. The shorter sections 25, 27 are fitted with unidirectional slides 29, 31 of thermosetting thermoplastic material, compression-fitted into the lower ends. Fixed fittings of similar material are also fitted to the ends of the longest unit 23. Two pairs of adjustable snap-on braces 33, 35 (FIG. 1) hold the upper portion of the frame in preset fixed positions. The ends of the braces spring-clip over the framing 23, 25, 27.

Figure 4:
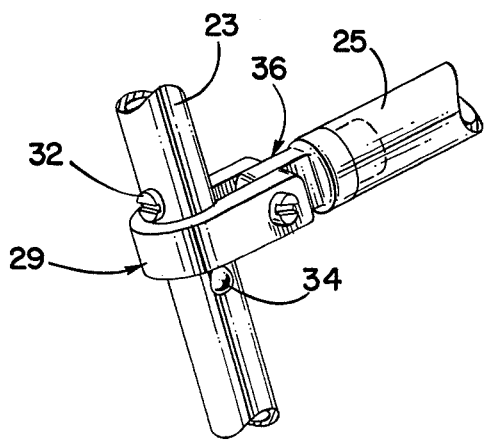
FIG. 4 is a detail of the apparatus used for slidably and pivotably attaching the frame members of the preferred embodiment.
Figure 5:
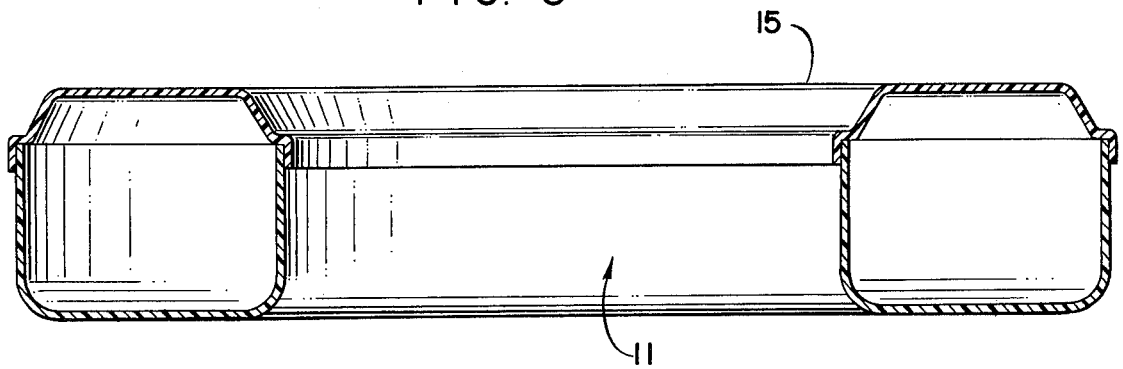
FIG. 5 is a section through the pannier of the preferred embodiment.

FIG. 4 illustrates in more detail the slide/pivot mechanism used to attach rigid U-shaped members 23, 25 to the frame structure. The hard plastic slide fitting 29 is centered into place in the tube 25. The maximum travel of the slide 29 in the unfolded position is determined by a stop screw 32 set to position. The slide 29 is allowed to ride up the tube 23 to the stop screw 32 by depression of a spring-loaded ball clip 34 installed in the tube 23 upon which sliding action occurs. As shown, the slide 29 incorporates a joint 36 which permits the tube 25 to pivot with respect to the tube 23.

Figure 3:
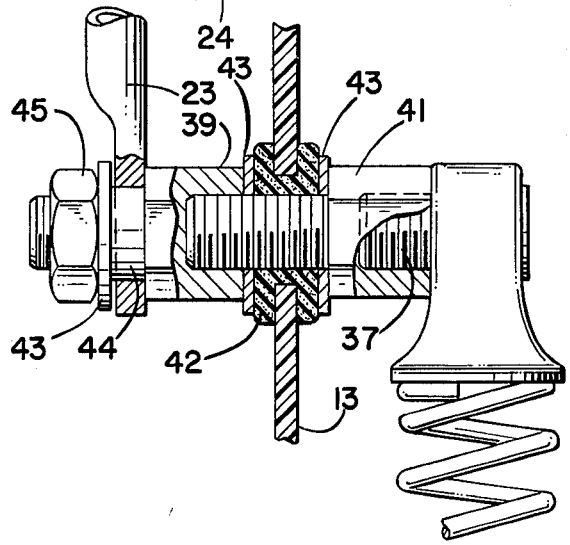
FIG. 3 is a vertical elevation illustrating an attachment detail of the preferred embodiment.

Referring to FIG. 3, the pannier 11 is fitted at its forward end to the rear spring upper mounting assembly bolt 37 of the motorcycle or other machine by the use of extension nuts 39, 41 which allow the necessary clearance between the pannier 11 and all permanent fixed parts of the machine. Fixing details include the use of a rubber grommet 42 and metal washers 43 to prevent damage to the fiberglass or plastic container 13. The framework 23 is fixed onto a second extension nut 39 which has a spacer or extension piece 44 incorporated so that the retaining nut 45 when tightened allows movement of the frame 23 in the vertical axis.

To fix the rear portion of the pannier 11, "Z" brackets are used between any convenient fixing point on the machine and a preset position on the pannier 11.

Figure 6:
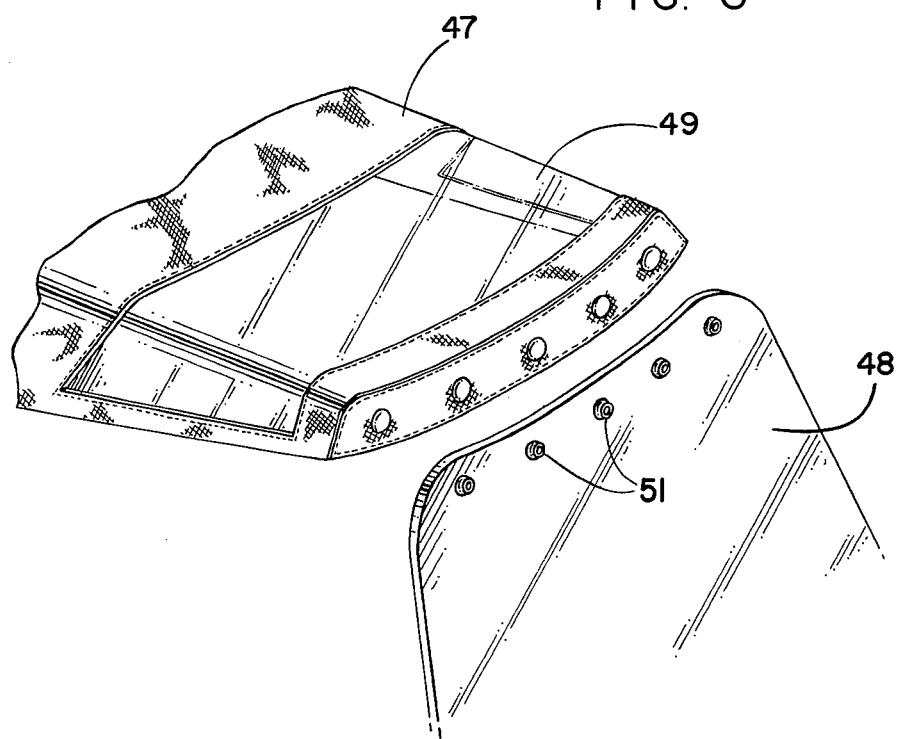
FIG. 6 is a detail of the windshield attachment mechanism employed in the preferred embodiment.

The whole of the frame 23, 25, 27 when erected is covered with a flexible cover 47 securely fixed to the rear and sides of the pannier 11 and to the top of the windshield panel 48 at the front with press strap or snap fasteners 51 (FIG. 1, FIG. 6). The flexible cover 47 incorporates a wrap-around clear view panel 49 above the windshield to allow clear front and side vision when the machine is inclined at an angle from the vertical when executing cornering maneuvers. The rear edge and the sides of the canopy 47 are permanently fixed to the insides of the pannier 11.

In inclement weather the rider has only to stop, dismount, and erect the canopy 47 by opening the pannier lid 15, erecting the framework by sliding the individual frame units 23, 25, 27 to their preset positions, and clipping in place the four adjustable braces 33, 35 which are used to keep the frame rigid. The flexible canopy 47 is pulled up over the frame and the front edge is clipped at the preset fixing points 51 on the windshield. The pannier lid 15 is then closed back to the framing 25 and the edge of the canopy 47 is clipped via additional snap fasteners 51 to the inclined pannier lid 15. This ensures that the lid 15 is restrained in its position and also does not allow the leading edge of the canopy 47 to flap in the wind. Optionally, side panels of clear plastic may be set into the sides of the canopy 47 by preset press/snap studs, thereby ensuring total body enclosure and protection from the elements. Optional leg guards may also be provided.

The invention prototype when tested was erected in less than a minute and dismantled and stowed away in its streamlined bolt-on pannier in slightly less time.

Since further modifications and refinements of the above-described embodiments will occur to those skilled in the art, it should be understood that the invention is not limited to the exact construction and operation shown and described above. Thus, within the scope of the appended claims, the invention may be practiced other than as specifically described herein.

What is claimed is:

1. Apparatus providing a convertible canopy for single-seat vehicles comprising:
   a pannier of substantially U-shaped cross-section curved to fit about the seat of a said vehicle and having apertures in the inner walls of the terminal ends thereof;
   a plurality of rigid U-shaped frame members each sized to fit within said pannier, the first of said rigid U-shaped frame members having an aperture in each of its respective ends;
   first attachment means attached to the respective ends of a second of said rigid U-shaped frame members for attaching said second frame member to said first frame member such that said second frame member may slide along said first frame member and pivot with respect thereto;
   second attachment means attached to the respective ends of a third of said rigid U-shaped frame members for attaching said third frame member to said second frame member such that said third frame member may slide along said second frame member and pivot with respect thereto;
   means insertable through the apertures in said pannier and in said first rigid U-shaped frame member for pivotably mounting said first frame member with respect to said pannier and for rigidly mounting said pannier with respect to said vehicle; and
   canopy means for covering said plurality of rigid U-shaped frame members.

2. The convertible canopy apparatus of claim 1 further including brace means for bracing the rigid frame members in an unfolded position wherein said canopy covers said vehicle.

3. The convertible canopy apparatus of claim 1 wherein said pannier has a lid pivotably attached thereto and wherein said apparatus further includes means for attaching said canopy to said lid so as to fix said lid in an open position.

4. The convertible canopy apparatus of claim 1 wherein said first and second attachment means each comprise a pair of fittings, one fitting fixed in the end of each of said second and third U-shaped members, and having pivotally mounted thereto a slide member shaped to fit about a frame member and slide with respect thereto.

5. The convertible canopy apparatus of claim 4 wherein each leg of said second and third U-shaped frame members bears a stop screw and a spring-loaded ball clip preset to stop a said slide member in a position wherein said canopy is unfolded.

6. The convertible canopy apparatus of claim 5 wherein said means insertable through said apertures includes:
   a first extension bolt mounted to said vehicle and having its extension extending through one of the apertures in said pannier; and
   a second extension bolt threadably attached to the extension of said first extension bolt, the extension of said second extension bolt extending through the aperture in said first rigid U-shaped member to provide a pivotal mounting therefor.

7. A bolt-on apparatus for providing a convertible canopy to a vehicle having a windshield and seat means comprising:
   first, second and third U-shaped tubular frame members, the first and second thereof having mounted thereon at points equidistant from their respective ends first and second stop screw means and first and second spring-loaded ball clips, the second and third thereof having mounted at their respective ends a fitting including a pivotally mounted slide means for sliding along a said frame member over a said ball clip and against a said stop screw means, said ball clips and stop screw being positioned to locate said second and third frame members in an open position extending over the rider position on said vehicle;
   brace means attachable to the ends of said frame members for bracing said frame members in open position;
   container means shaped to hold said frame members is an unfolded position and to fit about said seat means and having mounting apertures therein;
   a lid means pivotally mounted to said container means;
   canopy means attached to said container means and shaped to extend over said frame means in the open position for covering a rider;
   means for attaching said canopy to the windshield of said vehicle and to said lid means so as to hold said lid means in an open position;
   a first extension bolt having an extension for mounting said container means to said vehicle; and
   a second extension bolt threadably attachable to the extension of said first extension bolt for pivotally mounting said first frame member within said container means.

* * * * *